(12) United States Patent
Nafarieh et al.

(10) Patent No.: US 8,014,560 B2
(45) Date of Patent: Sep. 6, 2011

(54) PRESERVING SCANNER SIGNATURE USING MRC TECHNOLOGY

(75) Inventors: Asghar Nafarieh, Menlo Park, CA (US); Ramesh Nagarajan, Pittsford, NY (US); John C. Handley, Fairport, NY (US); Donald J. Curry, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 1137 days.

(21) Appl. No.: 11/807,080

(22) Filed: May 25, 2007

(65) Prior Publication Data
US 2008/0292130 A1    Nov. 27, 2008

(51) Int. Cl.
*G06K 9/00*    (2006.01)
(52) U.S. Cl. ....................................... 382/100
(58) Field of Classification Search .................. 382/100, 382/112, 175; 380/51, 55; 358/3.28; 270/52.02
See application file for complete search history.

(56) References Cited

U.S. PATENT DOCUMENTS

| | | | |
|---|---|---|---|
| 5,850,474 A | 12/1998 | Fan et al. | |
| 6,240,205 B1 | 5/2001 | Fan et al. | |
| 6,954,532 B1 * | 10/2005 | Handley et al. | 380/54 |
| 6,987,882 B2 | 1/2006 | Curry et al. | |
| 7,031,518 B2 | 4/2006 | Curry et al. | |
| 2003/0215245 A1 * | 11/2003 | Silence et al. | 399/8 |
| 2004/0114814 A1 * | 6/2004 | Boliek et al. | 382/233 |
| 2004/0123134 A1 * | 6/2004 | Sasich et al. | 713/200 |
| 2005/0275897 A1 * | 12/2005 | Fan et al. | 358/2.1 |
| 2006/0045361 A1 * | 3/2006 | Yokose | 382/232 |
| 2006/0225595 A1 * | 10/2006 | Gilfix | 101/489 |
| 2007/0076868 A1 * | 4/2007 | Ming | 380/54 |
| 2008/0091953 A1 * | 4/2008 | Bowers | 713/186 |
| 2008/0175476 A1 * | 7/2008 | Ohk et al. | 382/176 |
| 2010/0227550 A1 * | 9/2010 | Chang et al. | 455/39 |

OTHER PUBLICATIONS

Diaz et al. ("A Model for Electronic Representation of Bank Checks").*

* cited by examiner

*Primary Examiner* — Jason M Repko
*Assistant Examiner* — Shervin Nakhjavan
(74) *Attorney, Agent, or Firm* — Fay Sharpe LLP

(57) ABSTRACT

Systems and methods are described that facilitate encrypting document status information into a scanned image of a document using a mixed raster content document parsing protocol, in accordance with various features described herein. A text string comprising status information can be imaged into a mask layer that overlays the scanned image. Additionally or alternatively, the text string can be encrypted into a binary image that is encoded into the mask layer and overlaid on the image. The image itself is parsed into a background layer and one or more mask layers comprising different portions of the document. The encrypted mask layer comprising the text string and/or binary image can be generated using the same color as the background layer, such that the document status information is invisible and does not cause unwanted artifacts during printing or conversion of the document between formats. The document status information can be scanner signature information, scan-to-file authentication information, object metadata, etc.

20 Claims, 4 Drawing Sheets

PRESERVING SCANNER SIGNATURE USING MRC TECHNOLOGY

CROSS-REFERENCE TO RELATED APPLICATIONS

This application contains subject matter related to U.S. Pat. No. 5,850,474, entitled "Apparatus and Method for Segmenting and Classifying Image Data," filed on Jul. 26, 1996; U.S. Pat. No. 6,240,205, entitled "Apparatus and Method for Segmenting and Classifying Image Data," filed on Jun. 18, 1998; U.S. Pat. No. 6,987,882, entitled "Separation System for Multiple Raster Content (MRC) Representation of Documents," filed on Jul. 1, 2002; and U.S. Pat. No. 7,031,518, entitled "Segmentation Method and System for MRC Representation of Documents," filed on Jul. 1, 2002, the entireties of which are incorporated herein by reference.

BACKGROUND

The subject application relates to document scanning, and more particularly to transparently embedding scanner signature and other metadata into a document.

Although there has been research in the field of copier identification, scanner signature has been seldom visited, if at all. Copier signature techniques usually use repeated dot patterns that can be embedded in a printed image to record the state of the machine or other information about the printer or copier. In general, multifunction peripheral (MFP) products do not embed scanner signatures within the scanned document. This may be due to information losses when converting the document from one file format into another (embedded into a file header) or during compression (embedded into the bit stream).

When employing a scan-to-file technique, it is desirable for a file to be easily authenticated into a repository. It may be undesirable to permit an unauthorized user to dump files into a file system, but it is often desirable to store scanned files in a secure directory where only authorized users have access. Previous solutions involve storing personal or group "templates" that a user sets up and retrieves in a user interface on a multifunction device. For instance, a pool of templates setup by a system administrator can allow users to enter information such as URL's, network addresses, IP addresses, applications, passwords and the like to gain access to a repository. Other approaches attempt to use a paper UI such as SmartSend™ to encode the same information on piece of paper using glyphs. The paper sheet is scanned ahead of the document, is parsed, and sets up the authentication needed to get the document to its intended destination.

The office marketplace today is demanding "Graphics Arts" level of image quality at lower price. Single-pass segmentation that has been traditionally performed has its limitations. Autowindowing is a well-known method for segmenting image data into windows and for classifying the windows as typical image types. Autowindowing techniques include making two passes through the image data. Though autowindowing solves the problem of generating high quality copy output, it is still expensive to implement in an office image path. With Document Store & Recall features being implemented in several office products, the need to reproduce high quality output when exporting documents between devices is becoming important as well. One important issue associated with exporting autowindowing results between devices relates to the need to store and pass full-page tag information (typically several bits per pixel).

Accordingly, there is an unmet need for systems and/or methods that facilitate overcoming the aforementioned deficiencies.

BRIEF DESCRIPTION

In accordance with various aspects described herein, systems and methods are described that facilitate preserving document status information in an MRC file. For example, a method of encrypting document status information into a mixed raster content (MRC) document comprises generating a scanned image of a document, parsing the scanned image into a background layer and at least one mask layer, encrypting document status information, described in a text string, as a binary image in an encrypted mask layer, and overlaying the encrypted mask layer on the at least one mask layer and the background layer to preserve the document status information in the scanned image of the document.

The method can further comprise selecting a color for the binary image that matches a color of the background layer such that the binary image is not visible in the image of the document.

According to another feature described herein, a system that facilitates preserving document status information across multiple document format conversions comprises a scanner that scans a document and generates an image of the document, a processor that segments the image of the document and processes the image of the document, and a memory that stores the image of the document in MRC format. The system further comprises a document status information encrypter that encrypts a text string of document status information into a bitmap image and generates a mask layer comprising the bitmap image, which is overlaid on the image of the document.

DETAILED DESCRIPTION

In accordance with various features described herein, systems and methods are described that facilitate preserving scanner and/or document status information in a scanned document using mixed raster content (MRC) technology. Scanner signatures are typically difficult to maintain across file formats. For instance, signatures are lost when the file is converted from its original format. Accordingly, a method of generating a lossless scanner signature both in PDF and XML paper specification (XPS) documents is presented, which embeds an encrypted binary signature or other information as a mask layer within the MRC file format. The signature can be preserved even during file format conversions between PDF and XPS. The signature can be employed to identify a device that scanned the document(s), to preserve scanner identity in the scanned document(s), as a selective encryption field in scanned documents, and the like.

Figure 1:
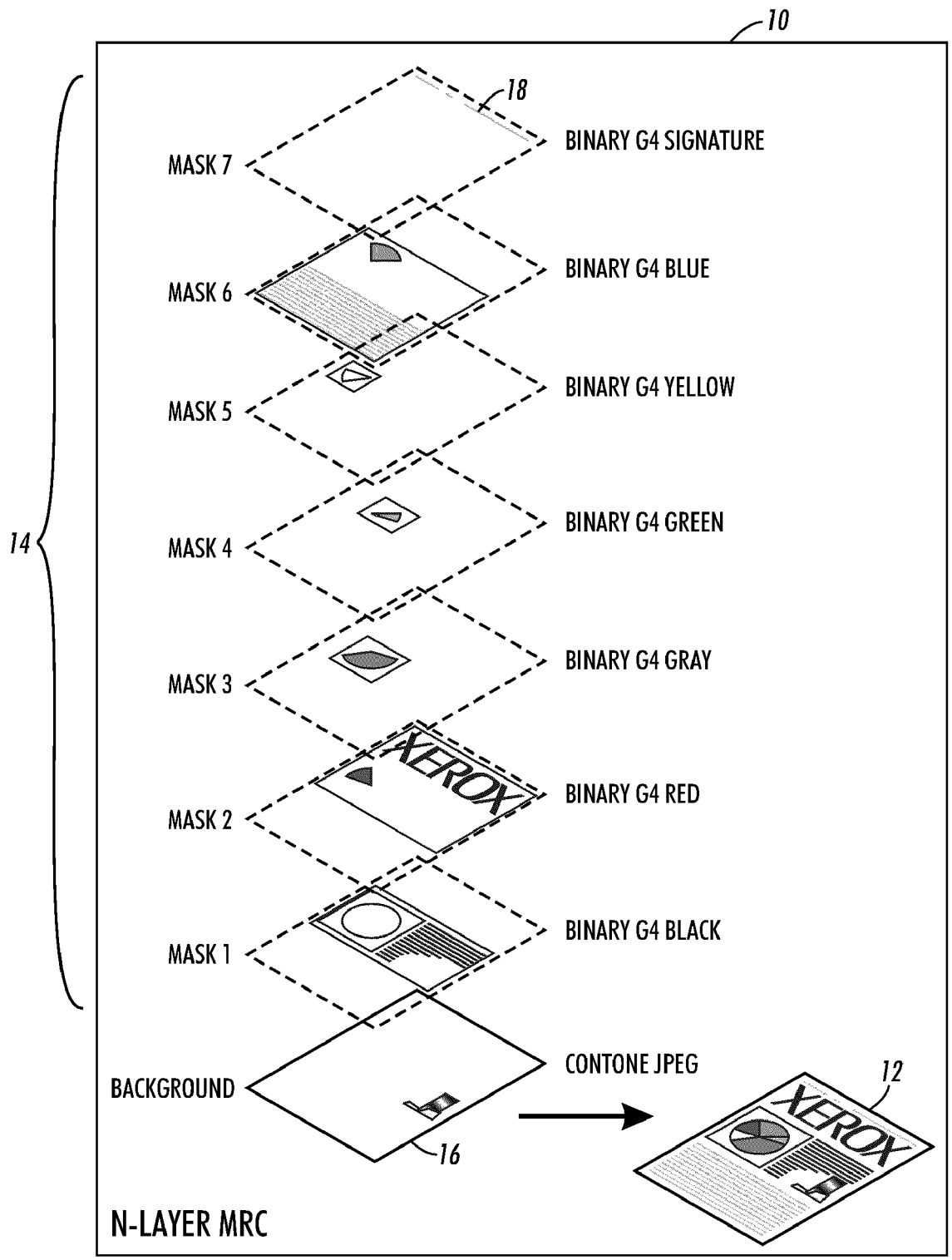
FIG. 1 illustrates an exploded view of an N-layer MRC document is illustrated, which comprises a number of layers, each of which in turn has a respective portion of the information to be graphically displayed in the document.

With reference to FIG. 1, an exploded view 10 of an N-layer MRC document 12 is illustrated, which comprises a number of layers, each of which in turn has a respective portion of the information to be graphically displayed in the document 12. The exploded view 10 shows seven mask layers 14, individually labeled as masks 1-7, each of which is overlaid on a background layer 16 and any preceding mask layers.

With the introduction of MRC technology in MFP products in the past several years, it has become desirable to preserve document integrity and state-of-machine information in scanned documents. This information can later be used to identify and authenticate the machine and other pertinent information about the scanner and/or file. Accordingly, the MRC document 12 has embedded therein scanner/MFP device information, as well as other related information, such as image digest or the like, into a binary form as one of the mask layers in PDF or XPS format. In this manner, document integrity and machine information are preserved during file format conversion and editing. Using conventional systems and/or methods, substantial amounts of information can be lost if embedded within the file format. In contrast, using the systems and methods described herein, the information is encrypted and converted into a 1-bit/pixel binary mask layer 18 within the MRC file format (e.g., PDF, XPS, or the like). Thus, in scenarios in which it is desirable to be able to verify that a document has not been tampered with or otherwise altered from its original form, the described systems and methods can facilitate maintaining document integrity and providing tamper-resistance. Such scenarios can relate to, for instance, military communications, legal communications, health-care related communications (e.g., subject to HIPAA and the like), official documents, contracts, or any other situations in which it is necessary or preferable to ensure that an original document is preserved.

According to an example, the 1-bit/pixel binary mask layer is encrypted as the first scan line of the document 12. The color of the mask layer may be chosen to be identical to the background layer so that it does not create any artifacts during viewing or printing of the document. For example, a gray mask could be chosen as 255 for white background. This layer may also be hidden behind the background plane using image operators in PDF or XPS. The following example illustrates this technique:

Scanner Signature Plain Text: ACME Corporation by XZY Program-yyyy-mm-dd
Encrypted date using crypt program with the Key=XYZMRC
fcd74bd249e5f1b1f6f794c7b484e5e6dc18b14e3d8b3dc8
9568ea51732aa9ffb
615b5b2b164cc6266ae1c65da14000e A binary mask layer (Mask 7, in the example in FIG. 1) having the above information is then generated and embedded into the MRC document 12. It will be appreciated that the scanner signature can include other information such as image layers MD5 digest, which logs user actions on a document, etc. This enables verification of integrity of the scanned image of the document without relying on the tagged information within the file format.

According to an example, the background layer 16 can comprise background image information (e.g., images, shading, etc.), and can be a contone jpeg image. Mask 1 can comprise data (e.g., binary G4 data, or some other suitable data type) printed or otherwise presented in black. Mask 2 may comprise red data, Mask 3 gray, Mask 4 green, Mask 5 yellow, and Mask 6, blue-colored data. In this manner, colored masks are overlaid on each other to generate the MRC image of the document. Mask 7 can comprise status information related to the scanner and/or document. Status information may comprise, without being limited to, a scanner signature, scanner ID information, scan-to-file authentication information, metadata related to objects in the document image, etc. Object metadata may include, without being limited to, location, size, date, type, etc., of the objects in the document. For instance, object type may be contone, halftone, low-frequency, high-frequency, smooth, rough, graphics, color, neutral, or the like. The status information can be printed or otherwise imaged in the same color as the background color the background layer 16, so that it is not visible to the human eye and does not cause undesirable artifacts when scanned. It will be appreciated that the MRC document is not limited to a background layer and seven mask layers, but rather that any suitable number of layers may be employed in conjunction with the various features presented herein.

According to another example, Mask 7 stores MRC-encoded data that describes a password or machine ID that is read and interpreted by a repository to allow access only to those authorized. For instance, the stored information may be utilized to authenticate a scanned file into a repository in order to mitigate file access authorization problems often encountered when employing scan-to-file techniques. The repository or application knows to look for the "hidden" scan-to-file authentication information and can authenticate the document (and sender), store the document in the intended destination, and/or process it with an appropriate authenticated application.

Yet another example relates to using the additional metadata information about the background objects to permit a receiving MFP device to selectively process the output without having to re-segment the image. Older MFPs that do not recognize or cannot process autowindowing results will print the background layer using same rendering for the whole page. In this manner, documents that are stored in a device and then later recalled in a different device can make maximum use of the information that has been recorded at the time of initial capture (e.g., scanning/ripping).

Figure 2:
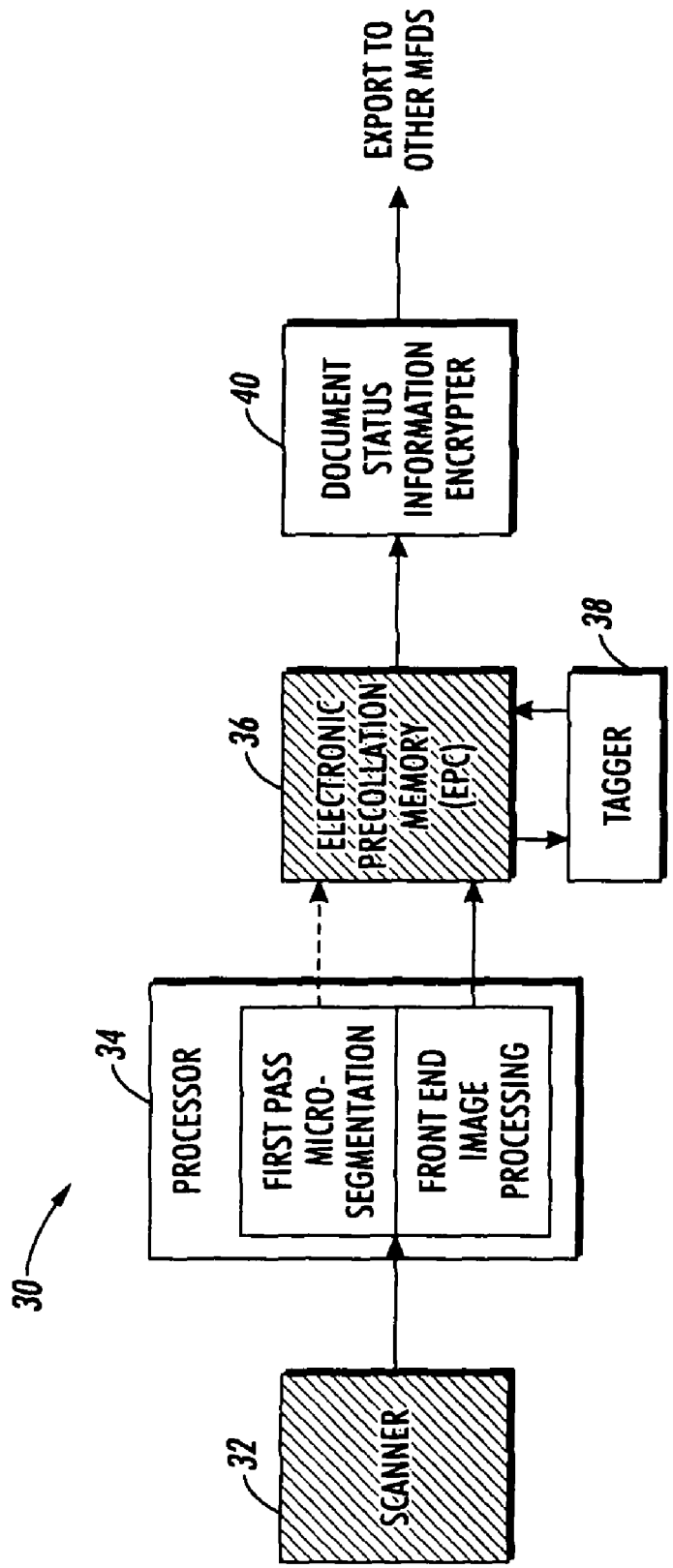
FIG. 2 illustrates a high level block diagram of a system for exporting autowindowing results between scanning and/or peripheral devices.

FIG. 2 illustrates a high level block diagram of a system 30 for exporting autowindowing or other segmentation results between scanning and/or peripheral devices. With increasing demand for Document Store & Recall features in the market, MFP devices are expected to export image data between devices, and customers expect similar image quality from a single device. Since image analysis is typically done at the time of scanning, such information can be exported along with the image. However, an impediment to conventional devices with regard to exporting autowindowing or other segmentation results between devices is the need to store and pass full-page tag information (typically several bits per pixel). The system 30 comprises a scanner 32 that scans a document or page and generates an image thereof. A processor 34 performs first pass micro-segmentation and front-end image processing. Segmented and processed image data is stored to an electronic precollation memory (EPC) 36, and such data is tagged and/or retagged by a tagger component 38. Tagged information is provided to a document status information encrypter, which encrypts status information into a mask layer, such as described with regard to FIG. 1.

The status information can include, for example, scanner ID information, scan-to-file authentication information, object metadata, etc. According to one example, the status information comprises metadata that describes the objects in the background layer of an MRC image. The description of the objects can contain, for instance, the location, size and type of the object (e.g., halftone, contone, low-frequency, high-frequency, etc). Using this additional metadata information about the background objects, a receiving MFP devices can selectively process the output without having to re-segment the image. MFP devices that do not recognize or cannot process autowindowing results can simply print the background layer with the same rendering. Thus, documents that are stored in a device and later recalled in a different device can optimize use of the information already recorded at the time of initial capture (scanning/ripping) by the scanner 32. This assists in reducing costs involved in exporting tags while mitigating adverse effects on devices that do not recognize autowindowing results.

Figure 3:
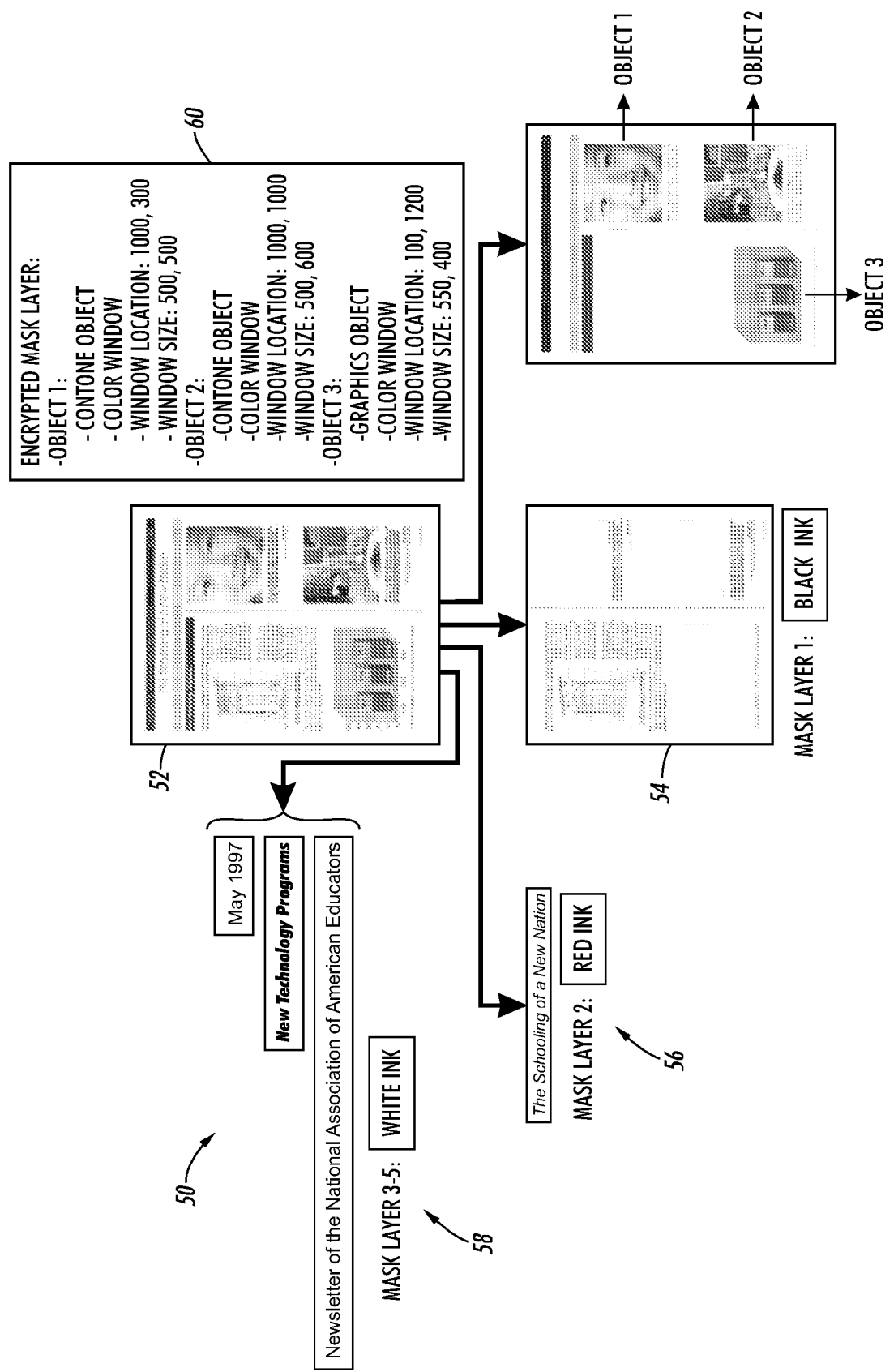
FIG. 3 illustrates a sample MRC file containing exported autowindowing results in an encrypted mask layer.

FIG. 3 illustrates a sample MRC file 50 containing exported autowindowing results in an encrypted mask layer. The file comprises an MRC document 52, which is generated as a series of layers. For instance, a first layer 42 can be generated using black ink, and may comprise text and/or other features presented in black in the image of the document. A second layer 56 can be generated in red ink, and may comprise red text and/or features imaged in red. Other layers 58 can be generated in white ink, and may comprise white text (e.g., imaged on a colored background) and/or other image portions presented in white. Additionally, the document 52 comprises an encrypted mask layer 60 that includes information describing one or more objects in the document. The extra encrypted mask layer 60 can include, for example: object ID information, object type information, object color information, window location information, object size information, etc. In other examples the encrypted mask layer 60 comprises scanner ID information, scan-to-file authentication information, or the like. Moreover, the encrypted mask layer can be imaged on the document 52 in a same color as the background color on which it is overlaid, so that it is invisible to the human eye and does not cause unwanted artifacts when scanned.

Figure 4:
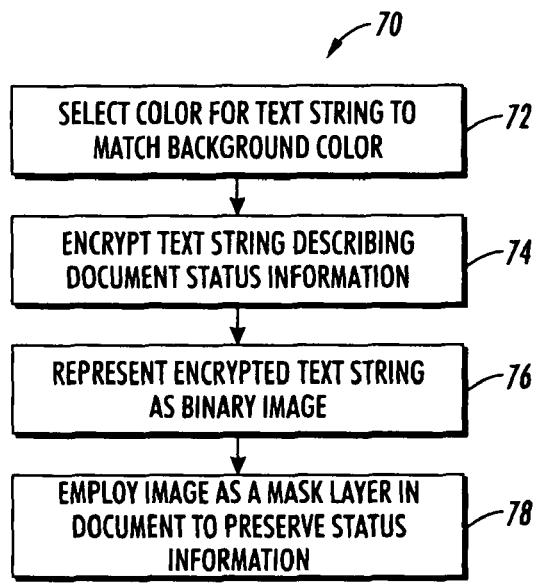
FIG. 4 is an illustration of a method of encrypting document status information into a mask layer in an MRC document, in accordance with one or more aspects described herein.
Figure 5:
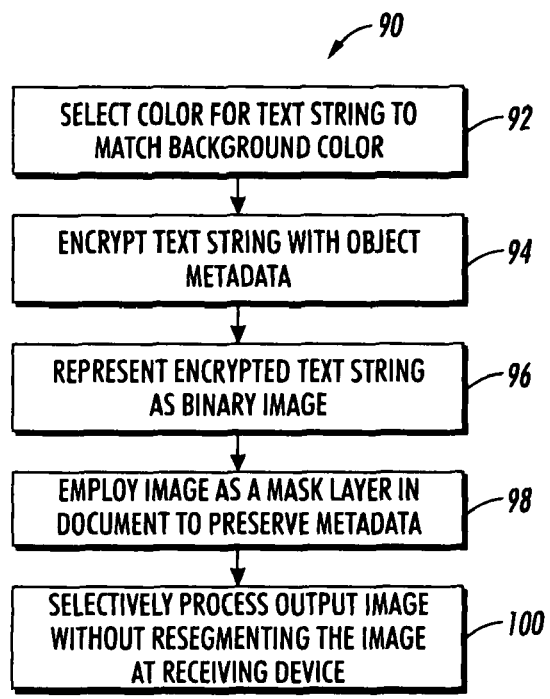
FIG. 5 illustrates a method of describing image objects in a background layer of an MRC file by encoding object metadata in a foreground mask layer.

FIGS. 4-5 illustrate one or more methods related to encoding document status information into an MRC document mask layer, in accordance with various features. While the methods are described as a series of acts, it will be understood that not all acts may be required to achieve the described goals and/or outcomes, and that some acts may, in accordance with certain aspects, be performed in an order different that the specific orders described.

FIG. 4 is an illustration of a method 70 of encrypting document status information into a mask layer in an MRC document, in accordance with one or more aspects described herein. At 72, a color is selected for a text string to be encoded, such that the selected color matches a background color of the MRC document. For example, if the background of the document is white, then white is selected as the color in which the text string, once encoded, will be printed or imaged on the MRC document. At 74, a text string describing document status information is encrypted. As described with regard to the preceding figures, the document status information can include without being limited to: scanner ID information, user ID information, object metadata, scan-to-file authentication information, etc. At 76, the encrypted text string is represented as a binary image. The image is then employed as a mask layer on the document to preserve the status information. For instance, the text string may be imaged over a background portion of the document (e.g., as a header, footer, or the like) in a manner that ensures that the encoded is not visible to the human eye, but recognizable to a MFP device that receives the document image at a later time. Additionally, the encrypted document status information can facilitate verifying document integrity, thus providing a tamper-resistant mechanism that permits recognition of a tampering attempt. According to one example, an attempt to alter the document status information can result in a read error that flags the document as being corrupt, thus signaling to a user or device that an attempt has been made to alter the document since its original scanning.

According to another example, once a document is scanned, it is converted into a plurality of planes, such as a background plane and a number of masks overlaying the background plane. For instance, the background plane may be white, a first mask plane may be associated with a color of the text or font to be imaged on the background, a second mask plane may be associated with a black-and-white and/or gray color, etc. The mask planes may also be referred to as selector planes, while the background plane is, for instance, a jpeg plane. The method 70 is then employed to generate a third (according to this example) selector plane comprising a bitmap (e.g., one bit/pixel or the like) that identifies the scanner that scanned the document. The color of the third selector plane is chosen to be the color of the background plane, such that the bitmap image is not visible and does not contribute to unwanted artifacts when converted, printed, etc. When the document is later retrieved, the retrieving device can analyze and/or decode the third selector plane and glean information there from, such as scan date, scanner ID, software version information, etc. For instance, a conversion between PDF and XPS formats preserves all layers, so the scanner signature is preserved in the bitmap image. According to a related example, the scanner ID and/or other information is encrypted and placed in a binary mask plane.

FIG. 5 illustrates a method 90 of describing image objects in a background layer of an MRC file by encoding object metadata in a foreground mask layer. By including metadata describing a segmented image, reconstruction and/or object manipulation at a receiving device is facilitated. At 92, a color is selected for use in presenting a binary image of the metadata, wherein the color is selected to match a background color of a document image in the MRC file. At 94, one or more text strings describing the object metadata are optionally encrypted using a predefined codec. At 96, the encrypted text is represented as a binary image. The image is employed as a mask layer in the document to preserve the metadata, at 98. The resulting image, with the encrypted mask layer overlaid thereon, is stored for later retrieval by, or directly output to, a receiving device, which can selectively process the document image without having to re-segment the image by decoding the object metadata.

As described above, the metadata comprises information such as location, size, date, type, etc., of objects in the document. For instance, object type may be halftone, contone, low-frequency, high-frequency, smooth, rough, graphics, color, neutral, or the like. It will be appreciated that although the encrypted metadata and/or document status information mask layers are described herein as being overlaid over other mask layers, the encrypted layers may alternatively be laid directly on the background layer according to other examples. In other cases, the encrypted layer can be hidden behind the background layer using image operators or the like provided, for example, by the PDF or XPS application.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of encrypting document status information into a mixed raster content (MRC) document, comprising:
   generating a scanned image of a document;
   parsing the scanned image into a background layer and at least one mask layer;
   encrypting document status information, described in a text string, as a binary image in an encrypted mask layer;
   overlaying the encrypted mask layer on the at least one mask layer and the background layer to preserve the document status information in the scanned image of the document; and
   selecting a color for the binary image that matches a color of the background layer such that the binary image is not visible in the image of the document;
   wherein the document status information comprises scanner identification information, scan date information, and scanner signature information.

2. The method of claim 1, wherein the scanned image of the document is in at least one of a PDF format and an XML paper specification (XPS) format.

3. The method of claim 1, wherein the document status information further comprises software version information 4. The method of claim 1, wherein the document status information comprises scan-to-file authentication information.

5. The method of claim 1, wherein the document status information comprises metadata descriptive of objects in at least one of the background layer or the at least one mask layer information.

6. The method of claim 5, wherein the metadata describes an identity of an object.

7. The method of claim 5, wherein the metadata comprises object type information.

8. The method of claim 5, wherein the metadata comprises object color information.

9. The method of claim 5, wherein the metadata comprises object location information.

10. The method of claim 5, wherein the metadata comprises object size information.

11. The method of claim 5, further comprising outputting the document image with the encrypted layer to a multifunctional peripheral (MFP) device, and processing the output image at the MFP device without re-segmenting the image.

12. A system that facilitates preserving document status information across multiple document format conversions, comprising:
   a scanner that scans a document and generates an image of the document;
   a processor that segments the image of the document and processes the image of the document;
   a memory that stores the image of the document in MRC format; and
   a document status information encrypter that encrypts a text string of document status information into a bitmap image and generates a mask layer comprising the bitmap image, which is overlaid on the image of the document;
   wherein the document status information comprises scanner identification information, scan date information, software version information, and scanner signature information.

13. The system of claim 12, wherein the document with the overlaid encrypted memory is stored to memory as at least one of a PDF file or an XPS file, and exported to an MFP device.

14. The system of claim 13, wherein the MFP device decodes the encrypted document status information to process the image of the document without re-segmenting the image.

15. The system of claim 12, wherein the document status information comprises scan-to-file authentication information.

16. The system of claim 12, wherein the document status information comprises metadata describing objects in the document.

17. The system of claim 16, wherein the metadata comprises at least one of object ID information, object type information, object color information, window location information, or object size information.

18. The system of claim 12, wherein a color for the binary image matches a color of the background layer such that the binary image is not visible in the image of the document.

19. A scanning plafform, comprising:
   one or more xerographic components that execute instructions for performing a xerographic process;
   a scanner that scans a document and produces an electronic image of the document;
   a processor that segments the image of the document and processes the image of the document into a plurality of layers;
   a memory that stores the image of the document in MRC format; and
   a document status information encrypter that encrypts a text string of document status information into a bitmap image and generates a mask layer comprising the bitmap image, which is overlaid on the plurality of layers that comprise the image of the document;
   wherein the document status information comprises scanner identification information, scan date information, and scanner signature information.

20. The scanning platform of claim 19, wherein the document status information further comprises software version information.

* * * * *